No. 632,797. Patented Sept. 12, 1899.
G. VAN HORN.
BICYCLE.
(Application filed Nov. 28, 1898.)
(No Model.)
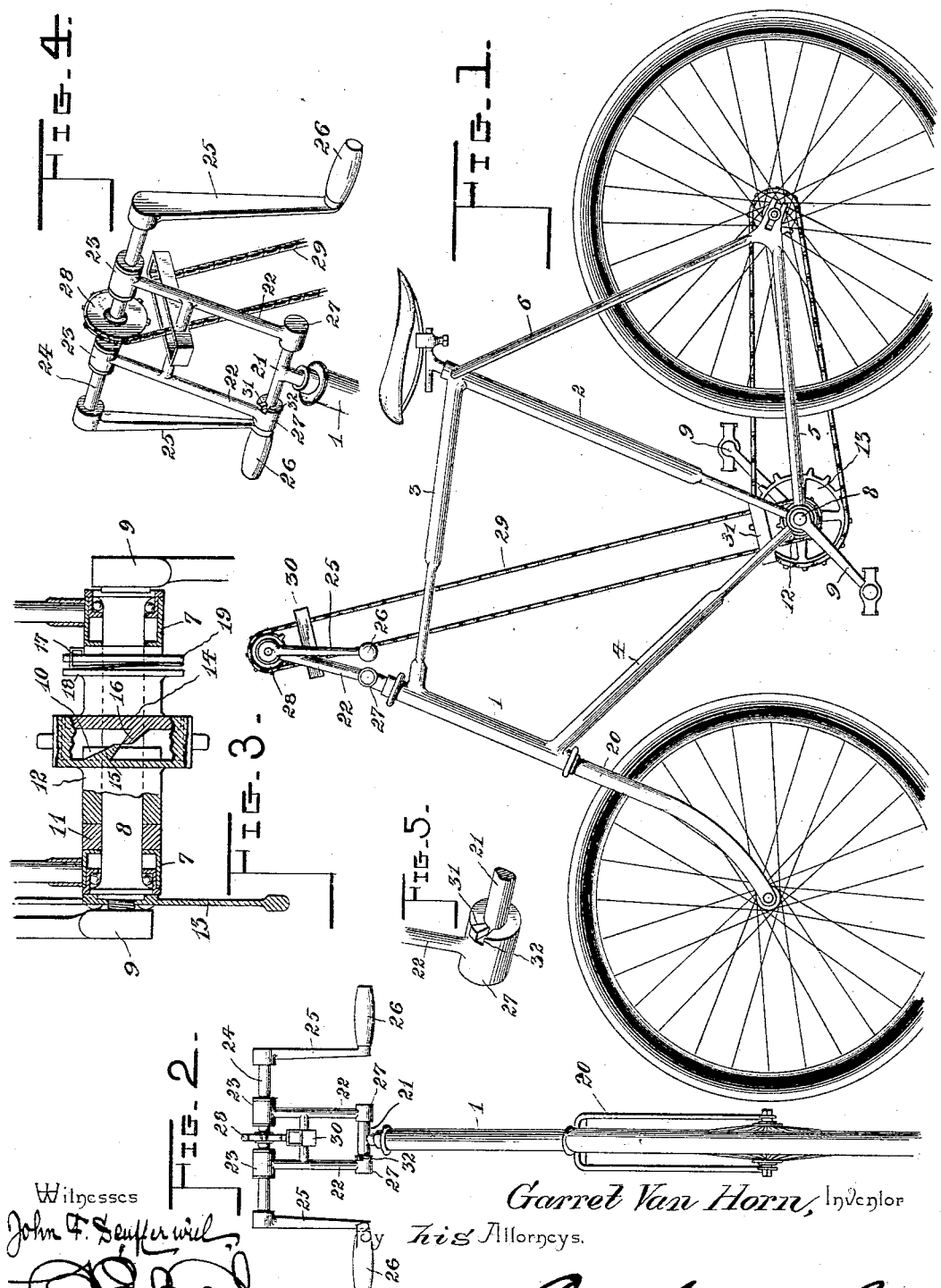
Witnesses
John F. Seufferwiel
Garret Van Horn, Inventor
By his Attorneys.
C. A. Snow & Co.

UNITED STATES PATENT OFFICE.

GARRET VAN HORN, OF HIGH GROVE, CALIFORNIA.

BICYCLE.

SPECIFICATION forming part of Letters Patent No. 632,797, dated September 12, 1899.

Application filed November 28, 1898. Serial No. 697,672. (No model.)

*To all whom it may concern:*

Be it known that I, GARRET VAN HORN, a citizen of the United States, residing at High Grove, in the county of Riverside and State of California, have invented a new and useful Bicycle, of which the following is a specification.

My invention relates to velocipedes, and particularly to bicycles, and has for its object to provide an improved driving mechanism whereby hand-power may be utilized in connection with foot-power in the driving of vehicles of this type to increase the power in ascending grades or when the maximum speed is required; and the invention consists in a simple, compact, and efficient construction and arrangement of parts whereby the handle-bar of the bicycle may be utilized as a manually-operated crank-shaft having a clutch connection with the foot-pedal-driving mechanism, whereby the machine may be driven either by a foot-power or hand-power, or both.

Further objects and advantages of this invention will appear in the following description, and the novel features thereof will be particularly pointed out in the appended claims.

In the drawings, Figure 1 is a side view of a bicycle provided with a driving mechanism constructed in accordance with my invention. Fig. 2 is a front view. Fig. 3 is a transverse section taken in the plane of the axis of the crank-axle. Fig. 4 is a detail view of the steering-frame crank-shaft and connected parts. Fig. 5 is a detail view of a portion of the steering-frame to show the means for limiting the swinging movement thereof.

Similar reference characters indicate corresponding parts in all the figures of the drawings.

The frame of the vehicle in connection with which my improved driving mechanism is shown may be of the ordinary or any preferred construction, as having a head-tube 1, a seat-post tube 2, upper and lower front braces 3 and 4, a rear brace 5, and a rear fork 6. The seat-post tube 2 and lower front brace 4 are forked or bifurcated at their lower extremities for attachment to the crank-hanger 7, in which is mounted the crank-axle 8, having the usual pedal-arms 9, and loosely mounted upon the crank-axle between inner and outer collars 10 and 11 is an auxiliary sprocket or chain wheel 12, which is wholly independent of the usual driving-sprocket 13, fixed, as in the ordinary practice, to the crank-axle. Said auxiliary sprocket is preferably hollow in construction, its rim being open at one side for the reception of a clutch-disk 14 for cooperation with a clutch-face arranged within the auxiliary sprocket, and in the construction illustrated the clutch-faces are provided, respectively, with detents or teeth 15 and 16, having beveled faces inclined rearwardly as they recede from each other and beveled rear faces which are similarly inclined. Hence when motion is communicated to the auxiliary sprocket in a forward direction and the detent 16 is in engagement with the detent 15 the forward pressure of the detent 15 will draw the detent 16 inward to advance the clutch member 14 toward the plane of the sprocket-wheel, while the movement of the sprocket-wheel in the opposite direction or the forward movement of the clutch 14 independently thereof will bring the rear sides or backs of the detents into contact, and thus cause the movement of the clutch axially from the sprocket-wheel. The clutch is feathered or otherwise fitted to slide axially upon the crank-axle, and it is yieldingly held in position to engage the extremity of the detent 16 with the detent 15 by means of a spring 17, interposed between a disk 18 at the outer end of the clutch-sleeve and a disk 19, which is fixed to the crank-axle parallel with and adjacent to the disk 18. The effect of said spring is insufficient to throw the clutch-disk into full engagement with the clutch-face of the sprocket-wheel, but, on the other hand, is only sufficient to cause the detent 16 to overlap the detent 15 a short distance—as approximately one-sixteenth of an inch—the relative movements of the clutch members with the beveled relations of the faces of the detents 15 and 16 being depended upon to insure the full engagement of the clutch members when forward motion is to be communicated from the auxiliary sprocket to the crank-axle, while a relatively opposite movement of the parts causes the clutch member 14 to be repressed to allow the rotation of the crank-axle independently of the auxiliary sprocket-wheel.

The stem of the front fork 20 carries at its upper end a steering-frame of bifurcated construction, consisting of a cross-head 21, rigidly attached to said stem, and parallel side arms 22, journaled at their lower extremities on said cross-head and terminating at their upper ends in bearings 23, through which extends a transverse handle-bar 24, constructed to form a crank-shaft and having terminal crank-arms 25 and grips 26. The lower extremities of the arms 22 are pivotally mounted upon the extremities of the cross-head 21, said arms in the construction illustrated having bearing-caps 27, which are fitted upon the extremities of the cross-head and are capable of a limited swinging movement adapted to allow a forward and rearward vibration of the upper extremities of the arms 22 through an arc of about one inch in length. Between the spaced inner ends of the bearings 23 is arranged a sprocket-wheel 28, which is connected with the auxiliary driving-sprocket 12 by means of a chain 29, said chain adjacent, respectively, to said connected sprockets extending through suitable guides 30 and 31. When it is desired to operate the machine by foot-power alone, the handle-bar may be grasped, as in the ordinary practice, either at the grips 26 or upon the straight shaft portion upon opposite sides of the head, as may be preferred, and when it is desired to assist the foot-power by the application of hand-power the crank-shaft 24 may be turned to communicate motion through the chain 29 to the auxiliary sprocket 12, whereupon said auxiliary sprocket will be locked to the crank-axle, as hereinbefore explained. The limited movement of the vibratory steering-frame with relation to the frame of the vehicle will allow the application to the chain 29 of the desired tension to insure the efficient communication of motion, whereas when the manual application of power is not desired the said chain will be sufficiently loose to prevent binding of the parts and will allow the machine to operate as in the ordinary practice in connection with pedal-driven vehicles.

Any suitable means may be provided for limiting the swinging movement of the steering-frame, the means illustrated in the drawings consisting of stop-shoulders 32 and 33, carried, respectively, by the bearings 27 and cross-head 21.

Various changes in the form, proportion, and the minor details of construction may be resorted to without departing from the spirit or sacrificing any of the advantages of the invention.

Having described my invention, what I claim is—

1. The combination with a vehicle having a crank-axle, of a steering-frame mounted pivotally at one end on the steering-stem and adapting its free end for vibratory movement toward and from the crank-axle, driving mechanism carried by the steering-frame, a flexible connection between said driving mechanism and the crank-axle, and adapted to be tightened by movement of the steering-frame to increase the distance between the same and the crank-axle, and means for limiting the swinging movement of the steering-frame, substantially as specified.

2. In a bicycle, the combination with a supporting-frame and crank-axle, of a vibratory steering-frame mounted for limited vibratory movement on a cross-head on the steering-stem, a crank-shaft mounted upon said frame and carrying a sprocket-wheel, said crank-shaft being provided with grips whereby the frame may be turned to steer the vehicle, and whereby the crank-shaft may be rotated, a chain connection between said sprocket-wheel and the crank-axle, and adapted to be tightened by movement of the steering-frame in a direction to increase the interval between the crank-shaft and the crank-axle, and means on the cross-head for limiting the vibratory movement of the steering-frame, substantially as specified.

3. In a bicycle, the combination with a supporting-frame having a steering-fork, and a crank-axle, of a cross-head carried by said steering-fork, spaced arms fulcrumed at their lower extremities upon said cross-head and having limited vibratory movement and terminating at their free ends in bearings, a crank-shaft mounted in said bearings and carrying a sprocket-wheel, and a chain connection between said sprocket-wheel and the crank-axle, substantially as specified.

4. In a bicycle, the combination with a supporting-frame and a crank-axle, of a steering-frame mounted for limited forward and rearward vibratory movement, a crank-shaft mounted in said frame and carrying a sprocket-wheel, a chain connecting said sprocket-wheel with a similar wheel upon the crank-axle, and upper and lower chain-guides carried respectively by said steering-frame and the machine-frame, and arranged adjacent to the said sprocket-wheels, substantially as specified.

5. In a bicycle, the combination with a supporting-frame and crank-axle, of auxiliary driving mechanism including a sprocket-wheel loosely mounted upon said crank-axle, said sprocket-wheel having a clutch-face, a clutch mounted for axial movement upon the crank-axle and also provided with a clutch-face, said clutch-faces consisting of undercut detents having beveled contacting faces, whereby, when engaged, the communication of motion from the sprocket-wheel to the clutch serves to hold them in operative relation, and automatic means for holding the points of the detents in operative relation and allowing the clutch to yield for disengaging the detents, substantially as specified.

In testimony that I claim the foregoing as my own I have hereto affixed my signature in the presence of two witnesses.

GARRET VAN HORN.

Witnesses:
 M. A. BAGLEY,
 J. B. HANNA.